US008860966B2

(12) United States Patent
Arakawa et al.

(10) Patent No.: US 8,860,966 B2
(45) Date of Patent: Oct. 14, 2014

(54) OPERATION APPARATUS, IMAGE FORMING APPARATUS PROVIDED WITH THE SAME, AND SHORTCUT ACCEPTANCE METHOD

(75) Inventors: Hiroki Arakawa, Osaka (JP); Yasuhiro Sekiguchi, Osaka (JP)

(73) Assignee: Kyocera Document Solutions Inc., Osaka-shi (JP)

( * ) Notice: Subject to any disclaimer, the term of this patent is extended or adjusted under 35 U.S.C. 154(b) by 126 days.

(21) Appl. No.: 13/534,824

(22) Filed: Jun. 27, 2012

(65) Prior Publication Data
US 2013/0003099 A1 Jan. 3, 2013

(30) Foreign Application Priority Data

Jun. 29, 2011 (JP) ................. 2011-144381

(51) Int. Cl.
G06F 3/12 (2006.01)
G06F 3/0488 (2013.01)
G06F 3/048 (2013.01)
G06F 3/0484 (2013.01)

(52) U.S. Cl.
CPC ............ G06F 3/04886 (2013.01); G06F 3/048 (2013.01); G06F 3/04845 (2013.01)
USPC ............... 358/1.13; 358/1.15; 358/1.9

(58) Field of Classification Search
None
See application file for complete search history.

(56) References Cited

U.S. PATENT DOCUMENTS

| | | | | |
|---|---|---|---|---|
| 5,537,608 A * | 7/1996 | Beatty et al. | | 379/158 |
| 6,567,627 B2 * | 5/2003 | Maeda et al. | | 399/81 |
| 6,785,487 B2 * | 8/2004 | Maeda et al. | | 399/81 |
| 2004/0160630 A1 * | 8/2004 | Iriyama et al. | | 358/1.15 |
| 2006/0055968 A1 * | 3/2006 | Sato et al. | | 358/1.15 |
| 2006/0195797 A1 | 8/2006 | Yeung et al. | | |
| 2006/0224961 A1 | 10/2006 | Omi et al. | | |
| 2006/0285143 A1 * | 12/2006 | Han et al. | | 358/1.13 |
| 2008/0178199 A1 * | 7/2008 | Tanabe | | 719/320 |
| 2009/0019271 A1 * | 1/2009 | Kawakami | | 712/227 |
| 2009/0083440 A1 * | 3/2009 | Kawakami | | 709/245 |

(Continued)

FOREIGN PATENT DOCUMENTS

| | | |
|---|---|---|
| EP | 2184648 A1 | 5/2010 |
| JP | 2006254431 A | 9/2006 |

(Continued)

OTHER PUBLICATIONS

English Abstract for KR 10-2011-0036222A.

(Continued)

*Primary Examiner* — Satwant Singh
(74) *Attorney, Agent, or Firm* — Knobbe Martens Olson & Bear LLP

(57) ABSTRACT

An operation apparatus includes a touch panel, a help unit, a shortcut inquiry unit, and a shortcut acceptance unit. The shortcut inquiry unit, upon detection, by the touch panel, of an input operation of the setting condition in a state in which the setting condition input window, which has been switched by the help unit, is being displayed, inquires about whether registration of a shortcut key used for directly switching to the setting condition input window corresponding to the setting item is desired or not, and accepts the registration of the shortcut key used for directly switching to the setting condition input window corresponding to the setting item, if the input operation for registration of the shortcut key is accepted by way of the touch panel.

16 Claims, 12 Drawing Sheets

(56) References Cited

U.S. PATENT DOCUMENTS

| | | |
|---|---|---|
| 2009/0183124 A1 | 7/2009 | Sridhar et al. |
| 2011/0080608 A1 | 4/2011 | Do et al. |
| 2011/0128575 A1 | 6/2011 | Iwata |
| 2012/0004033 A1* | 1/2012 | Lyons ........................ 463/35 |

FOREIGN PATENT DOCUMENTS

| | | |
|---|---|---|
| JP | 2006-285859 A | 10/2006 |
| JP | 2010-34963 A | 2/2010 |
| JP | 2011113392 A | 6/2011 |
| KR | 10-2011-0036222 A | 4/2011 |

OTHER PUBLICATIONS

Communication dated Aug. 19, 2013 from the Korean Patent Office for a counterpart foreign application.
A communication dated Sep. 4, 2013 from the Japanese Patent Office for a counterpart foreign application.
English translation of JP 2006-254431.
English translation of JP 2011-113392.
EESR issued to EP Application No. 12173151.7, mailed Jun. 18, 2013.

* cited by examiner

FIG. 6
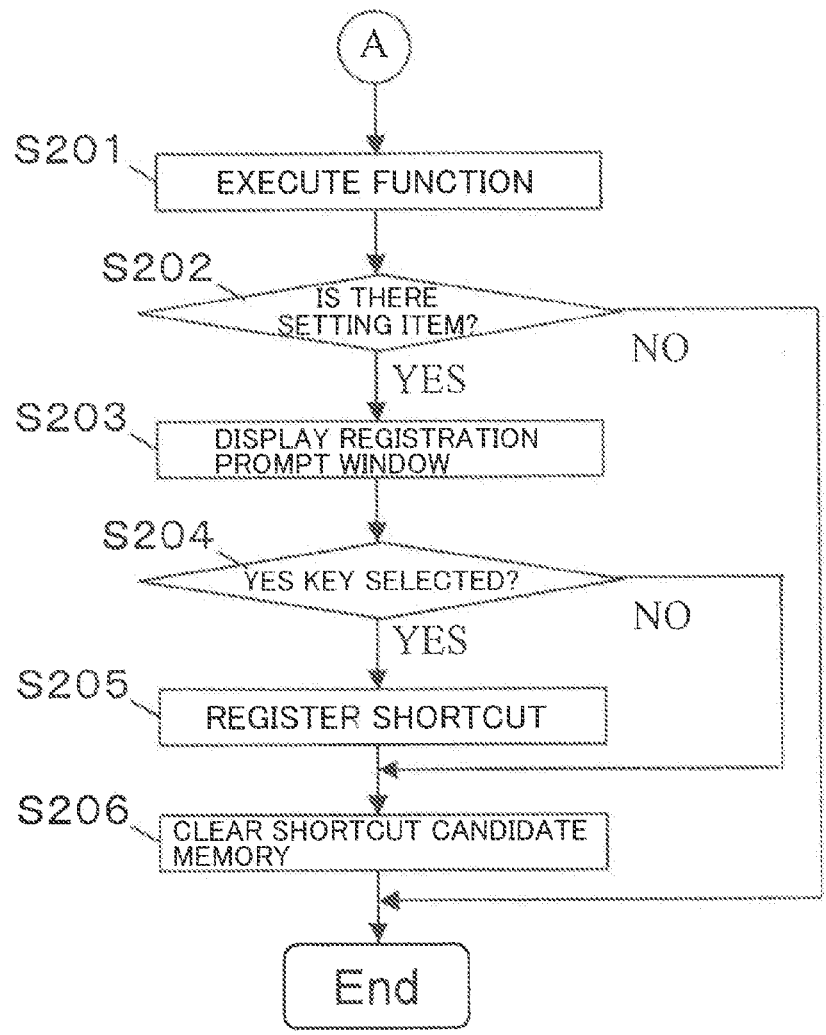
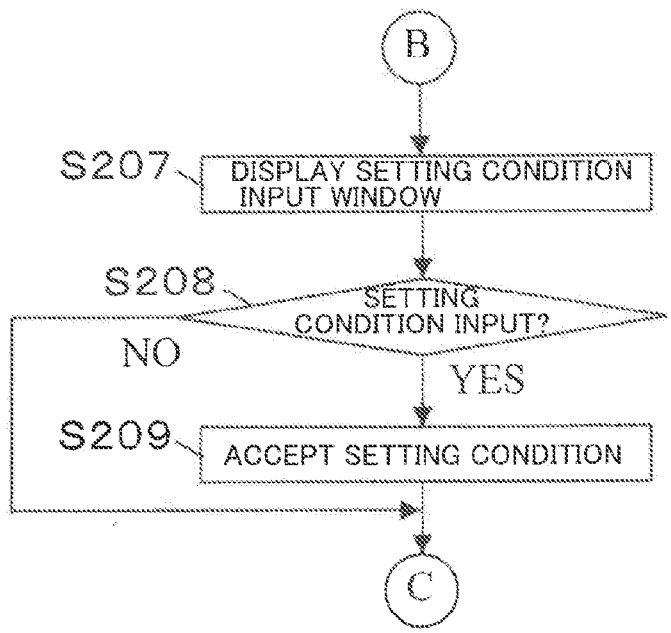

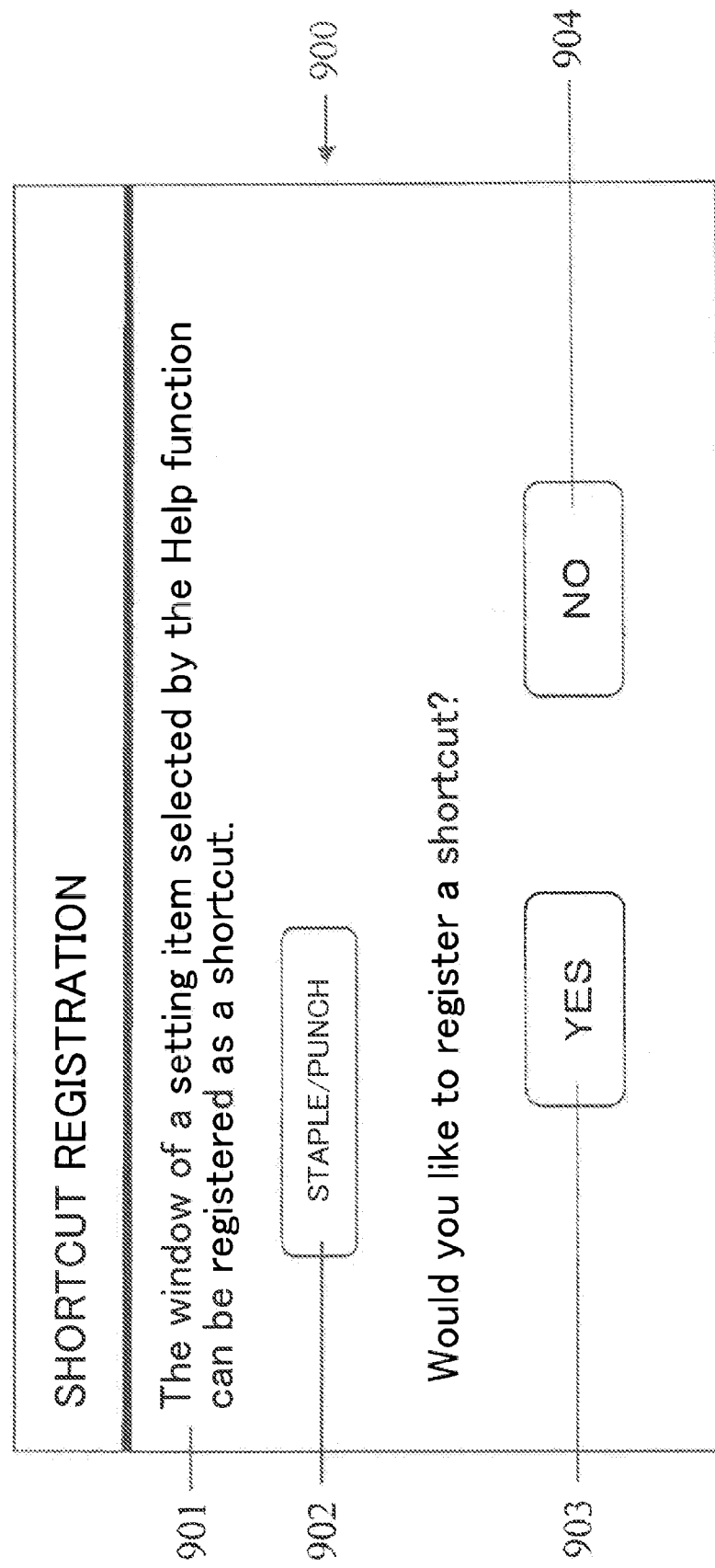

OPERATION APPARATUS, IMAGE FORMING APPARATUS PROVIDED WITH THE SAME, AND SHORTCUT ACCEPTANCE METHOD

REFERENCE TO RELATED APPLICATIONS

This application is based upon and claims the benefit of priority from the corresponding Japanese Patent Application No. 2011-144381, filed in the Japan Patent Office on 29 Jun. 2011, the entire contents of which are incorporated herein by reference.

BACKGROUND

The present embodiment relates to an operation apparatus, an image forming apparatus provided with the same, and an operation method.

Accompanying the rise in the functionality of various information processing apparatuses, the user interfaces (UI) thereof have become increasingly complicated. For example, even if the same set of keys is pressed in the same order, entirely different actions may be executed depending on a status of an apparatus upon pressing the keys. As described above, a configuration has been known in which various functions are assigned to a single key or button depending on the status. Such a configuration is advantageous for a reduction in the number of operation components and an improvement in versatility. However, such a configuration conversely demands complex operations by a user. Therefore, especially in an apparatus having such a user interface, it is necessary to provide a user with easily understood operating instructions.

Here, as an example of providing operating instructions according to the status of an apparatus, a technique of audibly outputting instructions of actions corresponding to an operations when in a help mode, and a technique of selecting operation guidance according to a state in which an operation key is pressed and audibly outputting the guidance have been known.

However, in the abovementioned techniques, the explanations for operation buttons are not specific and have confused user.

In addition, an information processing apparatus providing an operation mode and a tutorial mode presenting explanations corresponding to operations on the apparatus has been disclosed as a related art. This information processing apparatus includes: a presentation unit that presents explanations for an operation input made in the tutorial mode; a storage unit that stores the operation input; and a transition control unit that performs an action corresponding to the operation input stored in the storage unit in response to an input of a predetermined first input and causes a transition from the tutorial mode to the operation mode.

Meanwhile, image forming apparatuses with a shortcut function for improved operability have been becoming popular. The shortcut function is a function allowing a user to register a cumbersome setting, as well as frequently used settings and various setting windows in advance. The settings and setting windows registered by the shortcut function are reproduced by simple operations such as pressing a predetermined key.

In the abovementioned related art, the settings and the like registered in advance by the shortcut function can be produced by a simple operation from the next time. However, a registration operation of the setting and the like using the shortcut function is an unknown operation for a first-time user. The user, therefore, needs to perform the operation while referring to and considering an operation procedure displayed on a window or a procedure shown in an operation manual. The registering operation may be a substantial burden on a user until the user is familiar with the registering operation.

In order to address this problem, an operation apparatus has been disclosed that includes a display unit that displays various images and an operation unit that accepts an operation instruction. This operation apparatus includes a control unit that displays a shortcut registration button on the display unit when the operation unit accepts a setting instruction of a predetermined condition while a setting window for making settings is being displayed on the display unit, and performs shortcut registration of the setting window having been set to the predetermined condition, if the operation unit accepts a shortcut registration instruction made by pressing the shortcut registration button. According to this related art, the user can easily perform shortcut registration by using the shortcut registration button displayed on the display unit. In addition, according to this related art, the control unit can prompt a user unfamiliar with the shortcut function to make registration and can realize easy registration, by displaying the shortcut registration button on the display unit when the operation unit accepts a setting instruction of a predetermined setting condition.

SUMMARY

The operation apparatus includes a touch panel, a help unit, a shortcut inquiry unit, and a shortcut acceptance unit.

The touch panel displays a plurality of kinds of window including an operation window (initial window) displaying a HELP key for guiding input of a setting condition of a predetermined setting item, such that an input operation, including an operation on a plurality of software keys including the HELP key, can be detected.

The help unit switches, either directly or via another window, the display window that is displayed on the touch panel from the operation window to a setting condition input window in which the setting condition of a predetermined setting item among a plurality of setting items can be input, upon detection of the operation on the HELP key displayed on the operation window by the touch panel.

The shortcut inquiry unit, upon detection, by the touch panel, of an input operation of the setting condition in a state in which the setting condition input window, which has been switched by the help unit, is being displayed, inquires about whether registration of a shortcut key used for directly switching to the setting condition input window corresponding to the setting item is desired or not, and accepts the registration of the shortcut key used for directly switching to the setting condition input window corresponding to the setting item, if the input operation for registration of the shortcut key is accepted by way of the touch panel; and The shortcut acceptance unit, if the shortcut key is registered by the shortcut inquiry unit, displays the shortcut key used for directly switching to the setting condition input window corresponding to the setting item on the operation window on the touch panel, such that an operation on the shortcut key can be detected.

The image forming apparatus includes the operation apparatus.

The operation apparatus includes a touch panel, a help unit, a shortcut inquiry unit, and a shortcut acceptance unit.

The touch panel displays a plurality of kinds of window including an operation window (initial window) displaying a HELP key for guiding input of a setting condition of a predetermined setting item, such that an input operation, including an operation on a plurality of software keys including the HELP key, can be detected.

The help unit switches, either directly or via another window, the display window that is displayed on the touch panel from the operation window to a setting condition input window in which the setting condition of a predetermined setting item among a plurality of setting items can be input, upon detection of the operation on the HELP key displayed on the operation window by the touch panel.

The shortcut inquiry unit, upon detection, by the touch panel, of an input operation of the setting condition in a state in which the setting condition input window, which has been switched by the help unit, is being displayed, inquires about whether registration of a shortcut key used for directly switching to the setting condition input window corresponding to the setting item is desired or not, and accepts the registration of the shortcut key used for directly switching to the setting condition input window corresponding to the setting item, if the input operation for registration of the shortcut key is accepted by way of the touch panel; and The shortcut acceptance unit, if the shortcut key is registered by the shortcut inquiry unit, displays the shortcut key used for directly switching to the setting condition input window corresponding to the setting item on the operation window on the touch panel, such that an operation on the shortcut key can be detected.

A shortcut acceptance method for an operation apparatus including a touch panel that can display a plurality of kinds of windows including an operation window displaying a HELP key for guiding input of a setting condition of a predetermined setting item, such that an input operation, including an operation on a plurality of software keys including the HELP key, can be detected, displays a shortcut key on the operation window on the touch panel, such that an operation on the shortcut key can be detected.

The shortcut acceptance method includes a help step, a shortcut inquiry step, and a shortcut acceptance step.

In the help step, the operation apparatus switches, either directly or via another window, a display window displayed on the touch panel from the operation window to a setting condition input window in which the setting condition of a predetermined setting item among a plurality of setting items can be input, upon detection of the operation on the HELP key displayed on the operation window by way of the touch panel.

In the shortcut inquiry step, upon detection, by the touch panel, of an input operation of the setting condition in a state in which the setting condition input window, which has been switched in the help step, is being displayed, the operation apparatus inquires about whether registration of a shortcut key used for directly switching to a setting condition input window corresponding to the setting item is desired or not, and accepting the registration of the shortcut key used for directly switching to the setting condition input window corresponding to the setting item, if the input operation for registration of the shortcut key is accepted; and In the shortcut acceptance step, if the shortcut key is registered in the shortcut inquiry step, the operation apparatus displays the shortcut key used for directly switching to the setting condition input window corresponding to the setting item on the operation window on the touch panel, such that an operation on the shortcut key can be detected.

BRIEF DESCRIPTION OF DRAWINGS

FIG. 6 is a second flowchart for showing execution procedures of the present embodiment;

FIG. 9A is a diagram illustrating an example of a registration prompt window displayed on the touch panel according to the present embodiment.

DETAILED DESCRIPTION

Hereafter, an embodiment of an image forming apparatus provided with an operation apparatus of the present embodiment will be described with reference to accompanying drawings so as to contribute to the understanding of the present embodiment. It should be noted that the embodiment below is merely an example and is not intended to limit the technical scope of the present invention. Moreover, a prefix "S" attached to numbers in flow charts unit "step". Image forming apparatus and operation apparatus Hereafter, an image forming apparatus provided with an operation apparatus according to the present embodiment will be described.

Figure 1:
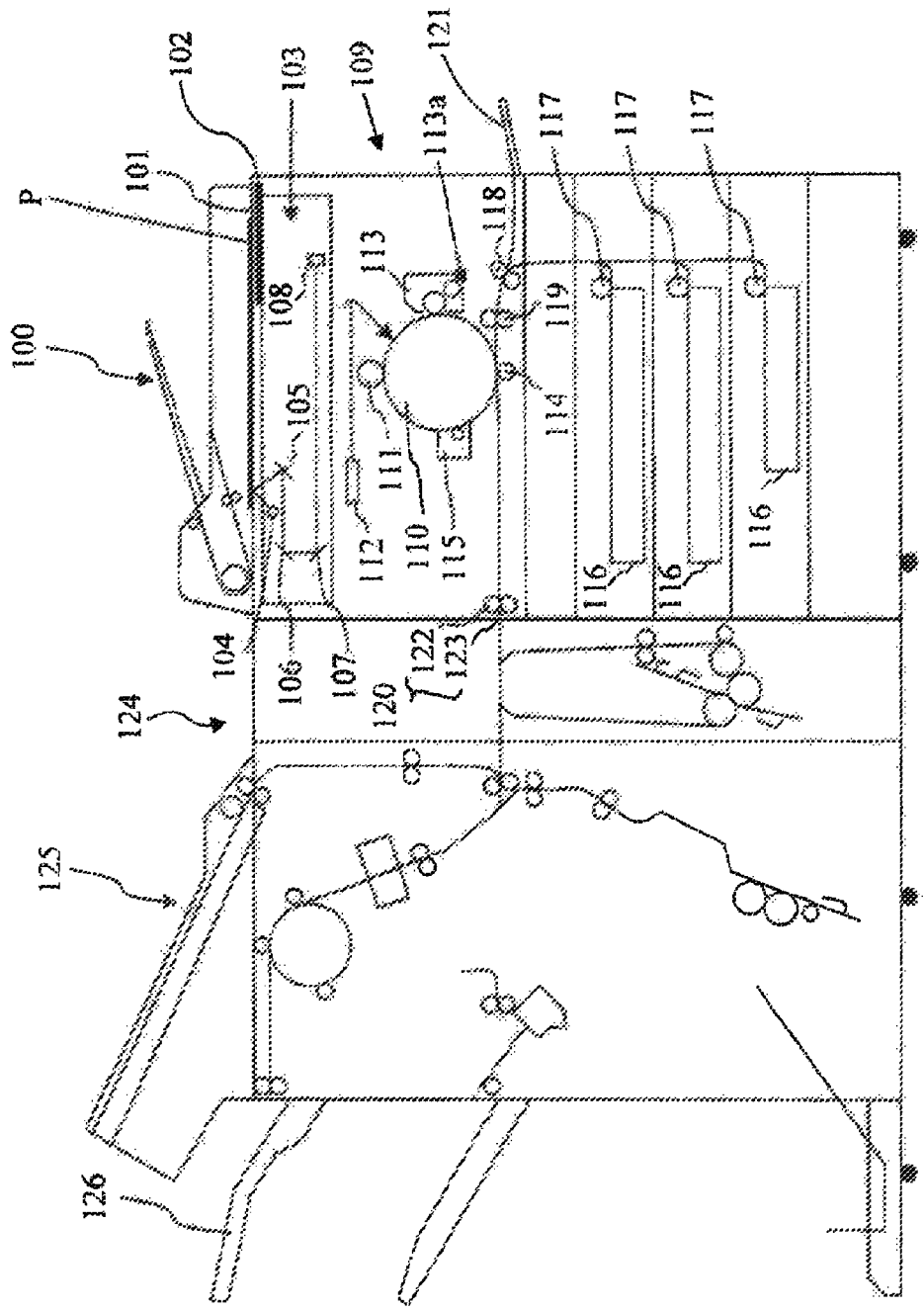
FIG. 1 is a conceptual diagram showing an overall configuration of the inside a multifunction peripheral according to the present embodiment.

FIG. 1 is a schematic diagram of an image forming apparatus according to the present embodiment. However, the details of each component not directly related to the present embodiment are omitted. The image forming apparatus according to the present embodiment is a multifunction peripheral or the like that includes for example, a printer or a scanner unit, or a printer, a copying machine, a scanner, a FAX, or the like, which functions as an image forming apparatus including a copy function, a scanner function, a facsimile function, a printer function and the like. Operation of a multifunction peripheral 100 (MFP: Multifunction Peripheral) in the case in which using copy function, for example, will be described briefly below.

First, when using the multifunction peripheral 100, the user places an original P on a platen 101 arranged at a top face of the multifunction peripheral 100, and inputs setting of copy function from an operation unit 102. In the operation unit 102 (touch screen 201), an operation window (initial window or the like) related to the copy function provided by the multifunction peripheral 100 is displayed. The operation unit 102 (touch screen 201) selectably displays a plurality of setting item keys related to the copy function.

In the operation window, function item keys for various functions are selectably displayed in tabs. A user inputs a setting condition relating to the copy function from the operation window.

After completing the input of the setting condition, the user makes the multifunction peripheral 100 start the process of the copy function by pressing a START key 205 provided in the operation unit 102.

When the multifunction peripheral 100 starts the process of copy function, an image reader 103 irradiates light from a light source 104 onto the original placed on the platen 101. Then, the light reflected from the original is guided to an imaging device 108 by mirrors 105, 106, and 107.

The imaging device 108 performs photoelectric conversion of the guided light and outputs the resultant as an electrical signal.

Then, a processing circuit (not illustrated) performs a fundamental correction process, image quality process, compression process, and the like, and generates an image data corresponding to the image formed on the surface of the original.

The image forming unit 109 transfers the image data as a toner image. The above image forming unit 109 is provided with a photoreceptor drum 110. The photoreceptor drum 110 rotates in a predetermined direction at a constant speed. In the periphery of the photoreceptor drum 110, a charging device 111, an exposure unit 112, a developing device 113, a transfer device 114, a cleaning unit 115 and the like are disposed, in this order from an upstream side in a rotational direction.

The charging device 111 uniformly charges a surface of the photoreceptor drum 110. The exposure unit 112 irradiates a surface of the photoreceptor drum 110 thus charged with laser based on the image data, thereby forming an electrostatic latent image. The developing device 113 deposits toner on the electrostatic latent image being fed, thereby forming a toner image on the surface of the photoreceptor drum 110. The transfer device 114 transfers the toner image thus formed to a recording medium (for example, a sheet). The cleaning unit 115 removes excessive toner remaining on the surface of the photoreceptor drum 110. This series of processes is performed by rotation of the photoreceptor drum 110.

The sheet is fed from a plurality of paper feeding cassettes 116 provided in the multifunction peripheral 100. The sheet to be fed is pulled out from any one of the paper feeding cassettes 116 to a paper path by a pickup roller 117. In each of the paper feeding cassettes 116, sheets of different types are stored. The sheets are fed based on setting regarding the output conditions.

The sheet being pulled out to the paper path is fed into between the photoreceptor drum 110 and the transfer device 114 by a feeding roller 118 and a resist roller 119. The sheet thus fed is, after transfer of the toner image thereto by the transfer device 114, further fed to the fusing device 120. The sheet fed by the feeding roller 118 may also be fed from a manual feeding tray 121 provided in the multifunction peripheral 100.

When the sheet to which the toner image is transferred passes between a heating roller 122 and a pressurizing roller 123 provided in the fusing device 120, heat and pressure are applied to the toner image, thereby fusing the toner image (visible image) onto the sheet. Heat quantity of the heating roller 122 is optimized according to types of sheets, in order to appropriately realizing the fusing. The image formation is completed with fusing of the toner image (visible image) onto the sheet. The sheet onto which the toner image (visible image) is fused is fed to the folding device 124 via the fusing device 120.

The sheet thus fed is subjected to a folding process in the folding device 124, according to the setting conditions input by the user. In a case in which the folding process is not set, the sheet simply passes through the folding device 124. In addition, in a case in which post-processing (for example, stapling, punching, binding and the like) is set by the user, the sheet having passed through the folding device 124 is fed to the binding device 125 for post-processing and stored in an ejected paper tray 126.

By the above described steps, the multifunction peripheral 100 provides the copy function to a user.

Figure 2:
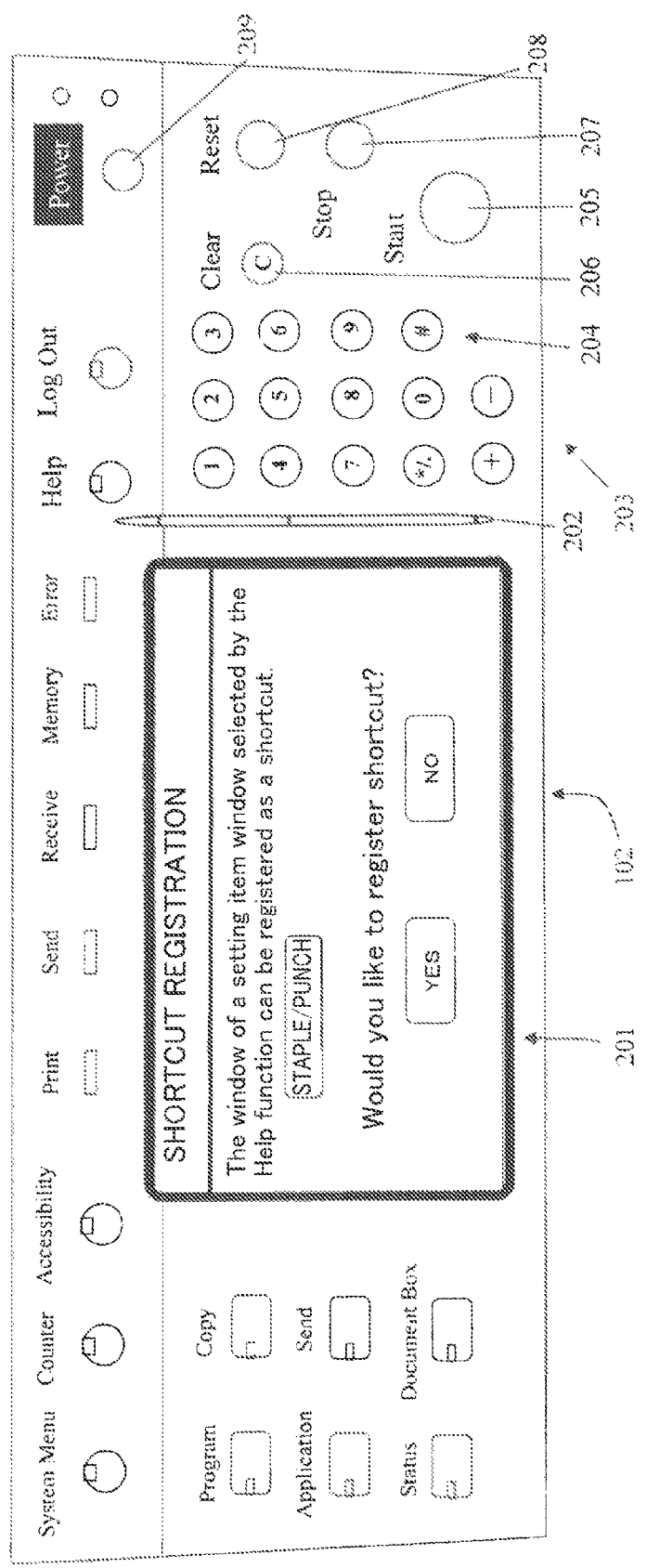
FIG. 2 is a conceptual diagram showing an overall configuration of the operation unit according to the present embodiment.

FIG. 2 is a conceptual diagram showing an overall configuration of the operation unit according to the present embodiment; A user inputs setting conditions or the like and confirms the setting conditions being input in relation to image formation as described above by use of the operation unit 102. When the setting conditions are input, the touch screen 201 (operation panel) provided in the operation unit 102, a stylus pen 202, and the operation key 203 are used.

A touch panel 201 can display a plurality of kinds of window including an operation window (initial window) displaying a HELP key 705 for guiding input of a setting condition of a predetermined setting item. The touch panel 201 displays the windows such that an input operation, including an operation on a plurality of software keys including the HELP key 705, can be detected.

The touch panel 201 includes a display unit 201*a* that can display a plurality of windows including a predetermined software key and a touch sensor 201*b* that is disposed to be layered on a display surface of the display unit 201*a*.

In the present embodiment, the touch sensor 201*b* is analog resistive film type.

The touch sensor 201*b* has a structure in which an upper film having translucency and a lower glass substrate are piled up via a spacer.

On facing surfaces of the upper film and the lower glass base plate, a transparent electrode layer composed of ITO (Indium Tin Oxide) and the like is provided.

The touch sensor 201*b* is composed such that, upon pressing of the upper film by a user, the transparent electrode layer on the upper film side and the transparent electrode layer on the lower glass base plate side contact each other at a position corresponding to a pressed position (user-indicated position, contacted position, contacted area).

The touch sensor 201*b* applies a voltage to the upper film or the lower glass base plate, and extracts a voltage value corresponding to the depression position from the lower glass base plate or the upper film to thereby detect a coordinate position (depression position) corresponding to the voltage value.

If the depression position thus detected is included in a display region of the software key displayed on the touch panel 201, the operation unit 102 accepts input (setting) of the function item, setting item and the like.

Furthermore, a display unit 201*a* such as an LCD (liquid crystal display) or the like is provided below the lower glass base plate.

The display unit 201*a* is configured to display an initial window 703 (operation window), a setting item selection window 800, a setting condition input window 805 and the like. In addition, the display unit 201*a* is configured to display a plurality of kinds of software keys including the HELP key 705.

As described above, the touch panel 201 is configured to display the initial window 703 (operation window), the setting item selection window 800, the setting condition input window 805 and the like.

In addition, the touch panel 201 is configured to detect an input operation on software keys displayed on the various windows. The touch panel 201 accepts an input operation on, for example, the HELP key 705, a setting item key 802, and a setting condition item key 807.

Furthermore, a stylus pen 202 is provided in the vicinity of the touch screen 201.

When the user makes a tip of the touch pen 202 contact on the touch panel 201 (touch sensor 201b), the touch panel 201 detects coordinate values corresponding to the contacted location (pressed location).

In a case in which a software key corresponding to (overlapping) the coordinate values thus detected is present (displayed), the touch panel 201 detects an operation (selection) on the software key.

In other words, the user can operate (select) a predetermined software key by a stylus pen 202 among the plurality of software keys that is displayed.

Furthermore, in the vicinity of the touch panel 201, a predetermined number of operation keys 203 is provided, including, for example, numerical keys 204, a START key 205, a CLEAR key 206, a STOP key 207, a RESET key 208, and a POWER key 209.

Figure 3:
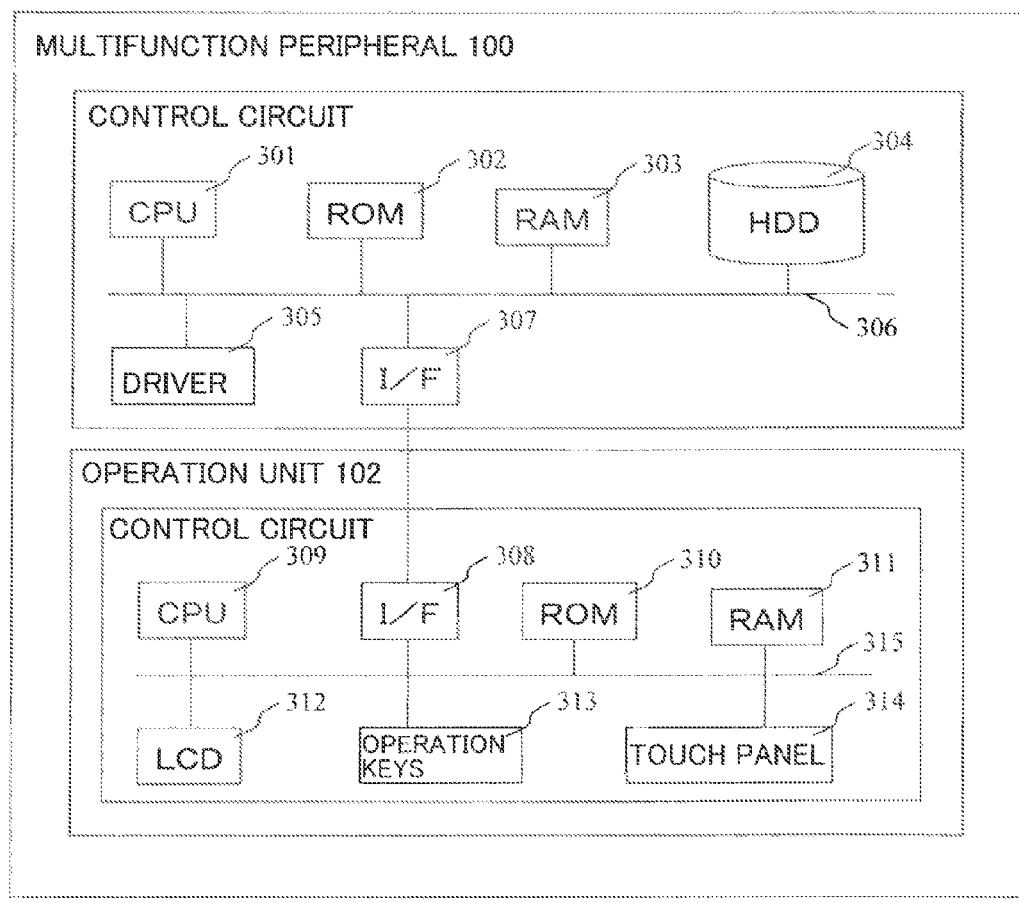
FIG. 3 is a diagram showing a configuration of control system hardware of the multifunction peripheral and the operation unit according to the present embodiment.

Next, a hardware configuration of a control system of the multifunction peripheral 100 and the operation unit 102 is described with reference to FIG. 3. FIG. 3 is a diagram showing a configuration of control system hardware of the multifunction peripheral 100 and the operation unit 102 according to the present embodiment. However, the details of each component not directly related to the present embodiment are omitted.

A control circuit of the multifunction peripheral 100 is configured such that a CPU (Central Processing Unit) 301, ROM (Read Only Memory) 302, RAM (Random Access Memory) 303, a HDD (Hard Disk Drive) 304, and drivers 305 respectively corresponding to the driving units are connected via an internal bus 306. The CPU 301 uses the RAM 303 as workspace, for example, and executes programs stored in the ROM 302, HDD 304, or the like, and sends and receives data and instructions from the driver 305 and the operation unit 102 (not illustrated) based on the execution result to control the operation of the driving units shown in FIG. 1. Each unit (illustrated in FIG. 4) described hereafter other than the drive units above is operated by execution of programs by the CPU 301.

In addition, an internal interface 307 is also connected to the internal bus 306 of the control circuit, and the internal interface 307 connects the control circuit of the operation unit 102, and the like to the control circuit of the multifunction peripheral 100.

The CPU 301 may receive command signals from the control circuit of the operation unit 102 or the like through the internal interface 307, and may transmit command signals, data, or the like to the control circuit of the operation unit 102 or the like.

In addition, the control circuit of the operation unit 102 is configured by connecting a CPU 309, a ROM 310, a RAM 311, an LCD 312, operation keys 313 (203), a touch panel 314 (201), and an internal interface 308 together with an internal bus 315.

When the user operates the operation keys 313 or the touch panel 314, the CPU 309 transmits command signals based on the operation to the control circuit of the multifunction peripheral 100 through the internal interface 308. The function of the CPU 309, the ROM 310, and the RAM 311 is the same as the above, and each unit described below (illustrated in FIG. 4) is realized by execution of programs by the CPU 309. The programs or data for realization of each unit described below are stored in the ROM 310.

Figure 4:
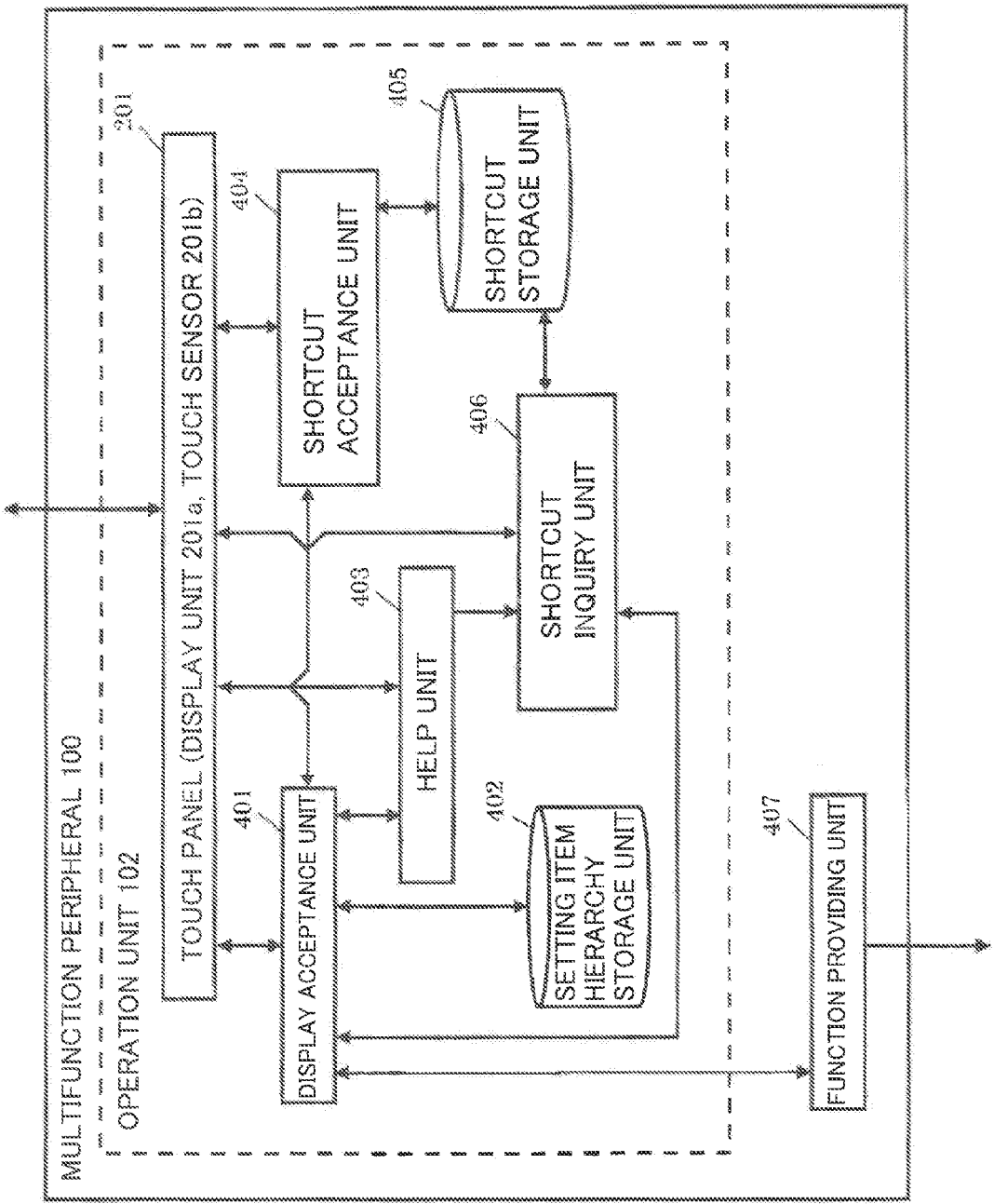
FIG. 4 is a functional block diagram of the multifunction peripheral and the operation unit according to the present embodiment.
Figure 5:
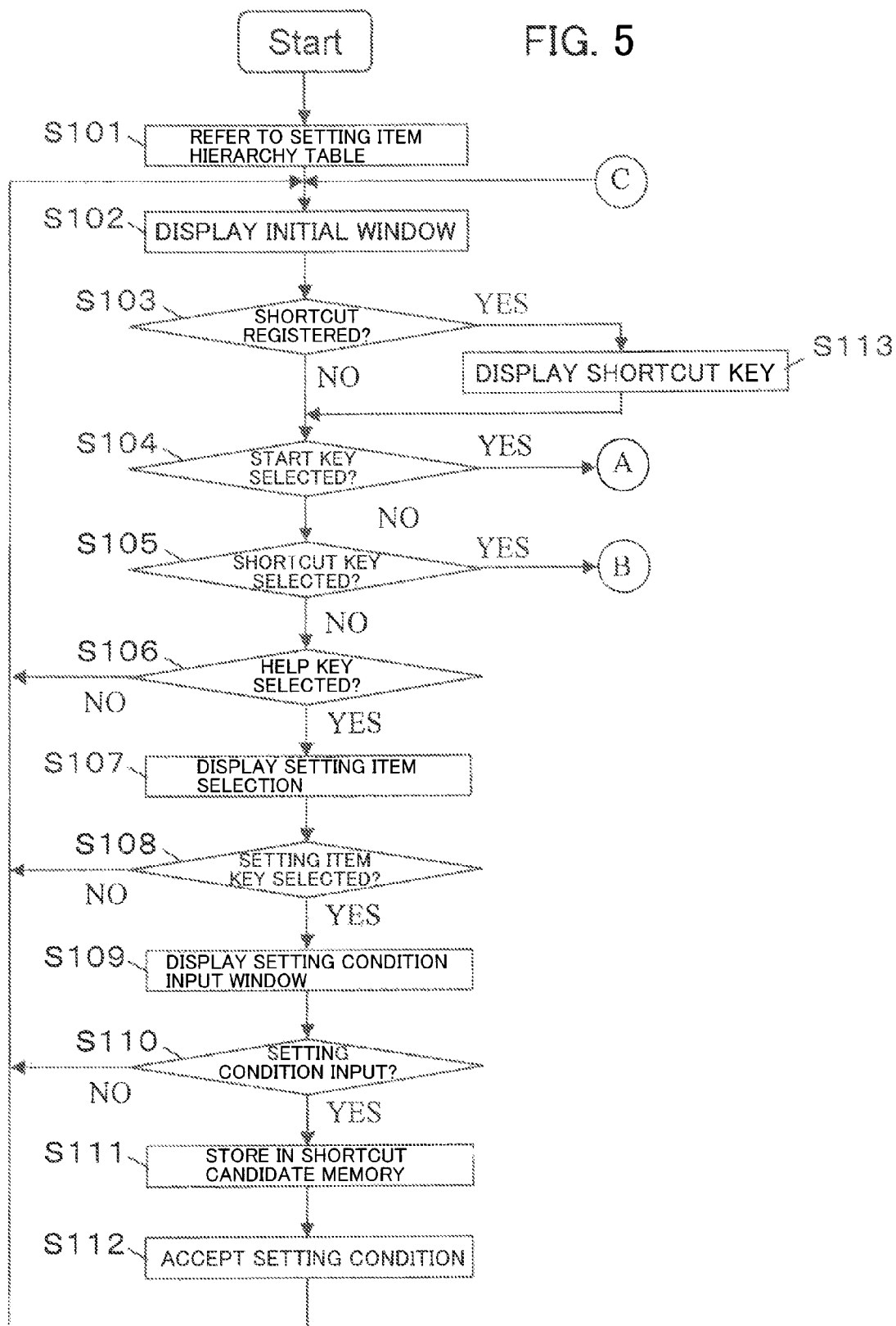
FIG. 5 is a first flowchart for showing execution procedures of the present embodiment.

Next, configurations and execution procedures according to the present embodiment will be described with reference to FIGS. 4 to 6. FIG. 4 is a functional block diagram of the multifunction peripheral and the operation unit according to the present embodiment. FIGS. 5 and 6 are flowcharts illustrating the execution procedure according to the present embodiment.

First, when a user turns on the multifunction peripheral 100, the operation unit 102 is activated upon activation of the multifunction peripheral 100. Thereafter, a display acceptance unit 401 of the operation unit 102 thus activated obtains initial setting conditions stored in advance in predetermined initial setting condition memory. The initial setting conditions are initial conditions (initial values) for each setting item relating to functions provided by the multifunction peripheral 100. In addition, the display acceptance unit 401 refers to a setting item hierarchy table stored in advance in a setting item hierarchy storage unit 402 (FIG. 5: Step S101).

Figure 7A:
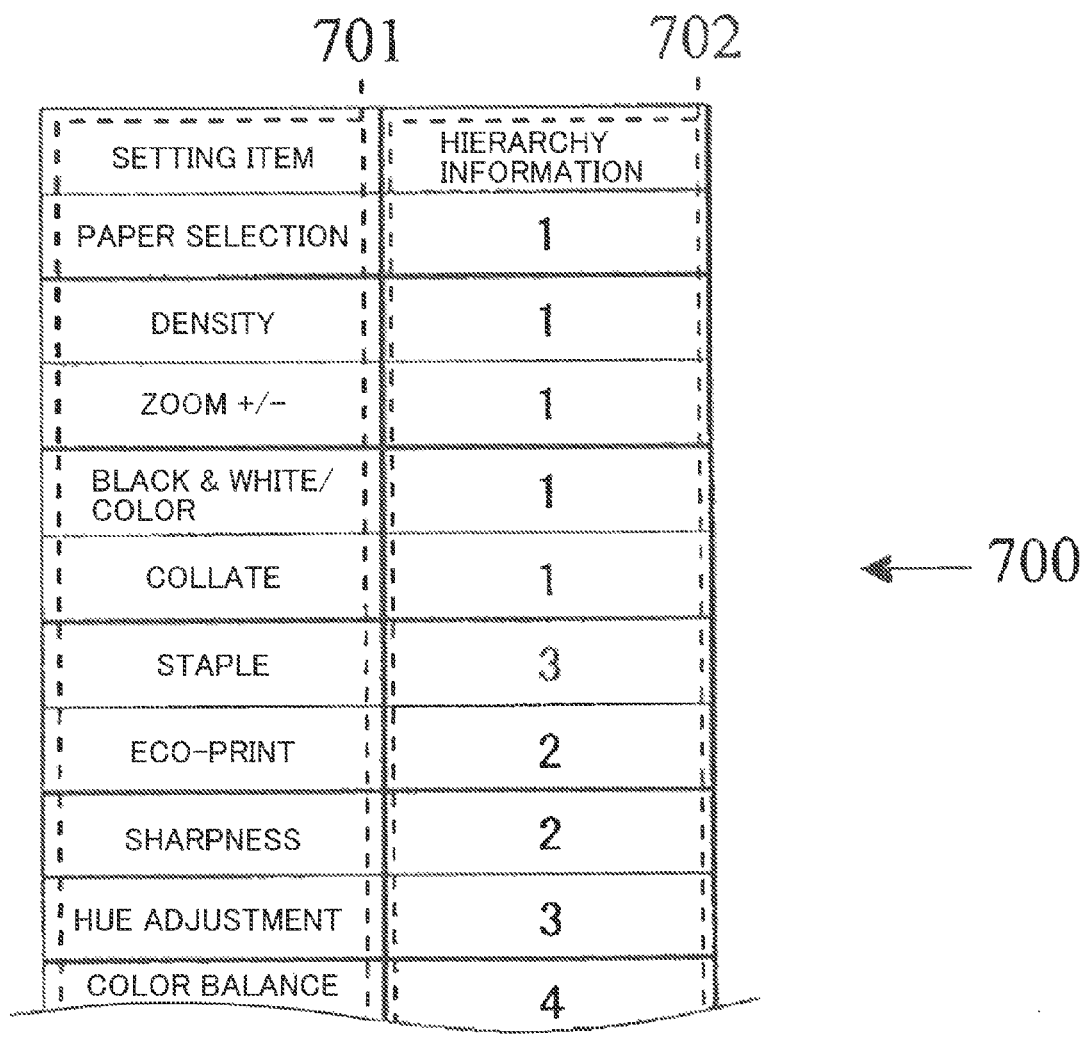
FIG. 7A is a diagram showing an example of a setting item hierarchy table according to the present embodiment.

In the setting item hierarchy table 700, as shown in FIG. 7A, the setting item 701 (for example, "Paper Selection" and the like) and hierarchy information 702 (for example, "1" and the like) of a window in which a setting item 701 is displayed are stored in association with each other.

Here, the hierarchy information 702 includes the ranking of windows on which keys of the setting items 701 are displayed, with respect to the initial window. For example, if a key of the setting item 701 (for example, "Paper Selection" key) is displayed on the initial window, the hierarchy information 702 corresponding to the setting item 701 is "1". If a key of the setting item 701 ("Eco-print" key) is displayed on a window that is one layer lower than the initial window, the hierarchy information 702 corresponding to the setting item 701 is "2". If a key of the setting item 701 ("Staple/Punch" key) is displayed on a window that is two layers lower than the initial window, the hierarchy information 702 corresponding to the setting item 701 is "3". As described above, the value stored as the hierarchy information 702 will be greater with a lower ranking of the window displaying the setting item 701. The number of windows to be switched will be greater with a greater value of the hierarchy information 702. In other words, the number of times of pressing (operating) the software key by the user required for reaching the window will be greater with a greater value of the hierarchy information 702.

After referring to the setting item hierarchy table 700, the display acceptance unit 401 obtains the setting item 702 ("Paper Selection" and the like) with the hierarchy information "1", which is the ranking of the initial window, and then displays the initial window (operation window) displaying the setting item 702 thus obtained on the touch panel 201 (FIG. 5: Step S102).

When the display acceptance unit 401 displays the initial window on the touch panel 201, the display acceptance unit 401 notifies a help unit 403 and a shortcut acceptance unit 404. In response to the notification, the help unit 403 displays a predetermined HELP key on the initial window to be detectable by touch panel. In response to the notification, the shortcut acceptance unit 404 refers to a shortcut storage unit 405 (FIG. 5: Step S103).

Here, if the shortcut storage unit 405, which is referred to by the shortcut acceptance unit 404, is not storing anything, the shortcut acceptance unit 404 determines that there is no shortcut registration (FIG. 5: Step S103; NO) and does nothing. A case in which the shortcut storage unit 405 stores a predetermined setting item (FIG. 5: Step S103; YES) is described later.

Figure 7B:
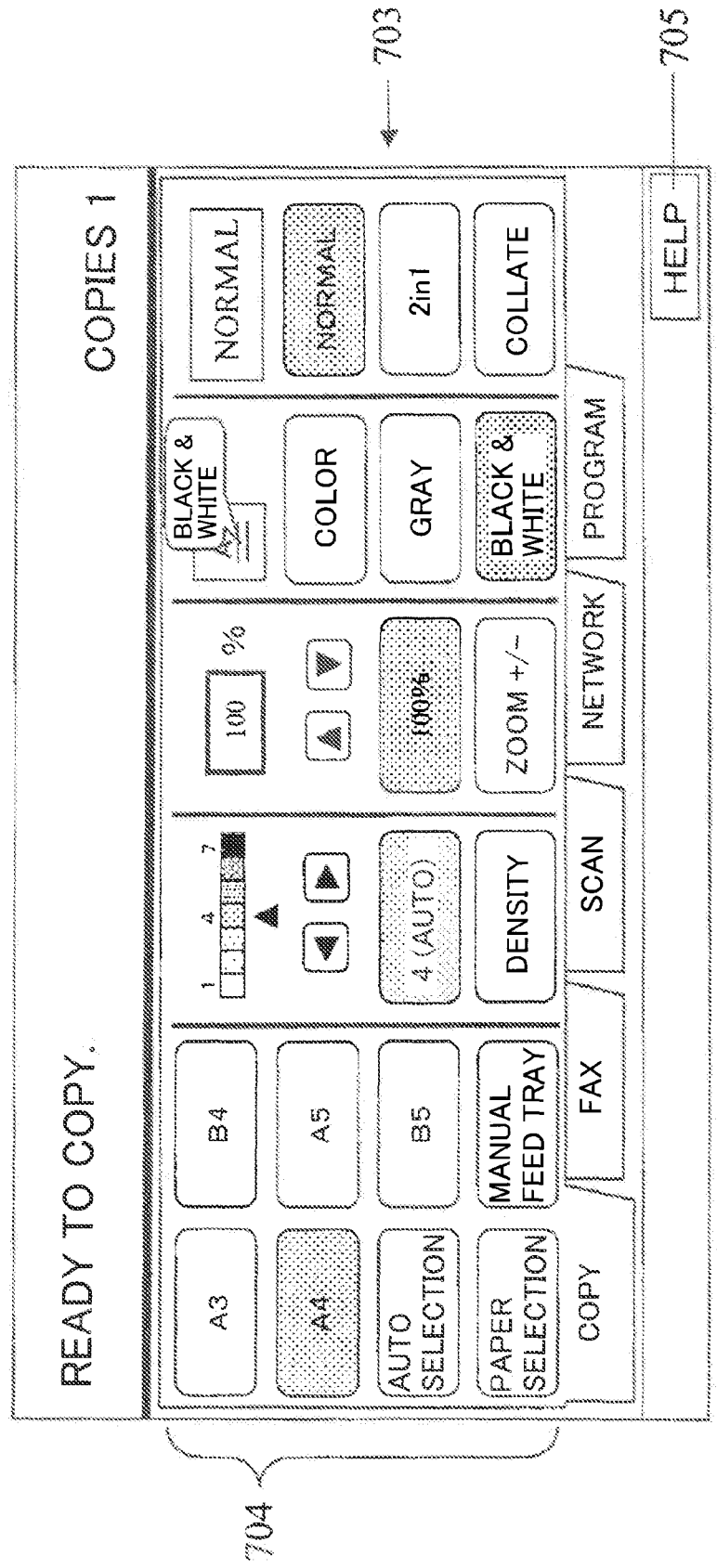
FIG. 7B is a first diagram illustrating an example of an initial window displayed on the touch panel according to the present embodiment.

The initial window 703 displays the plurality of setting item keys 704 and the HELP key 705 for guiding the input of the setting condition of the predetermined setting item key 704, as shown in FIG. 7B. The touch panel 201 displays the initial window 703 such that operations to the plurality of setting item keys 704 and the HELP key 705 for guiding the input of the setting condition of the predetermined setting item key 704 can be detected.

A user looking at the initial window 703 presses the HELP key 705 (FIG. 5: Step S106; YES) without pressing (operating or touching) the START key 205 to find a desired setting item key not displayed on the initial window 703 (FIG. 5: Step S104; NO). The help unit 403 accepts the pressing (operating or touching) of the HELP key 705 and displays, on the touch panel 201, the predetermined setting item selection window (help window) on which a plurality of setting item keys which is not displayed on the initial window 703 is displayed. The help unit 403 displays the setting item keys of the setting item selection window on the touch panel 201 such that pressing (operating or touching) of the setting item keys can be detected (FIG. 5: Step S107).

Here, the help unit 403 switches, either directly or via another window, the display window on the touch panel 201 from the initial window 703 (operation window) to a setting condition input window in which the setting condition of a predetermined setting item among the plurality of setting items can be input, upon detection of the operation on the HELP key 705 displayed on the initial window (operation window) by the touch panel 201.

In the present embodiment, the help unit 403 switches the display window on the touch panel 201 from the initial window 703 (operation window) to the setting condition input window via the setting item selection window.

In a case in which the help unit 403 displays the setting item selection window on the touch panel 201, the help unit 403 refers to the setting item hierarchy table 700 and obtains the setting item 701 (for example, "Staple/Punch", "Eco-print" and the like) associated to the hierarchy information 702 (for example, "2", "3" and the like) that is different from "1", which is the hierarchy information 702 for the initial window 703. Thereafter, the help unit 403 displays the setting item selection window on the touch panel 201 based on the setting item 701 thus obtained.

As described above, the help unit 403 displays the setting item key, which is displayed on a lower layer window than the initial window (operation window) 703, on the setting item selection window on the touch panel 201, such that an operation on the setting item key can be detected.

Figure 8A:
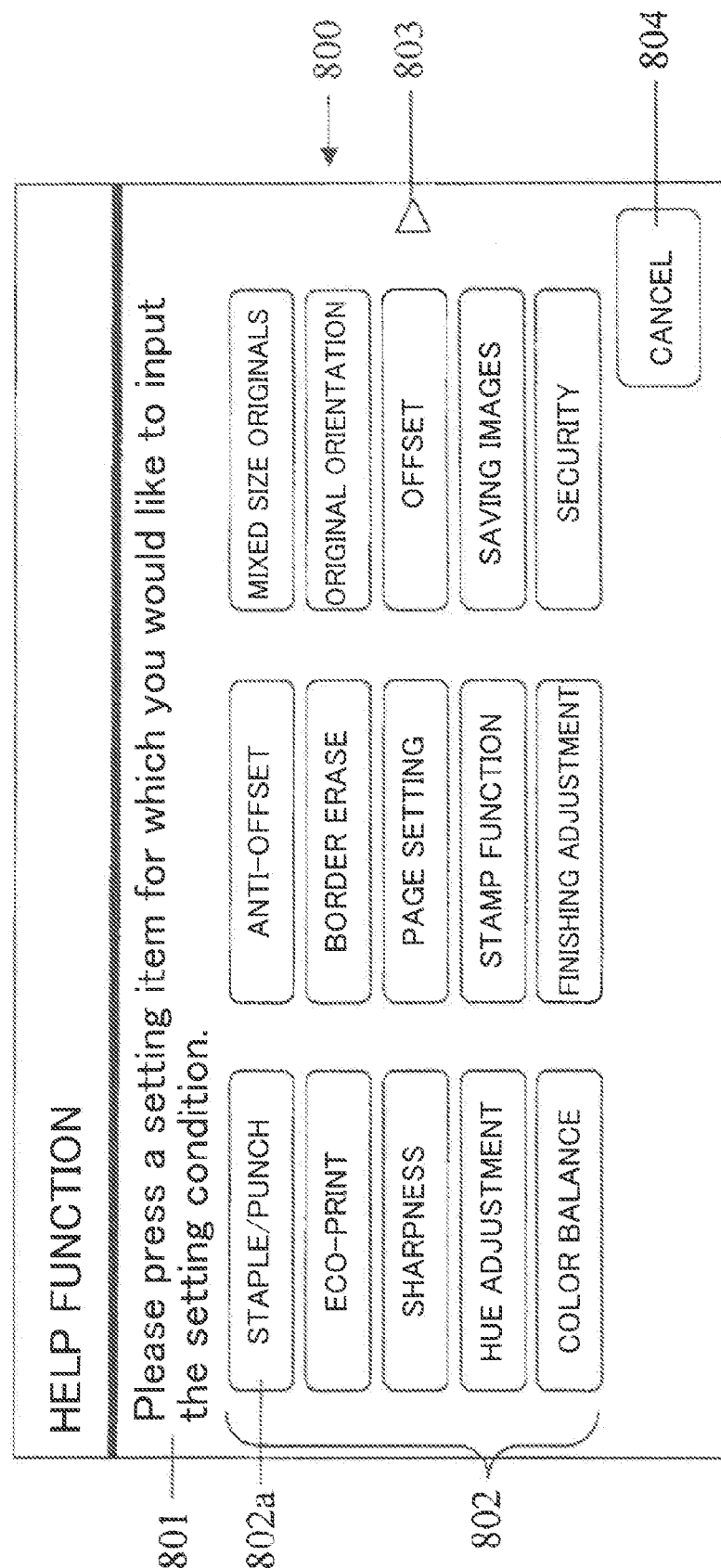
FIG. 8A is a diagram illustrating an example of a setting item selection window displayed on the touch panel according to the present embodiment.

On the setting item selection window 800, a message 801 "Please press a setting item for which a setting condition is to be input", a plurality of setting item keys 802 which is not on the initial window 703, a scroll key for displaying the setting item keys not appearing on the setting item selection window 800, and a CANCEL key 804 are displayed as shown in FIG. 8A.

A user thus can easily find a setting item key that is not on the initial window 703.

When the user looking at the setting item selection window 800 presses the "Staple/Punch" key 802a, which is the predetermined setting item (FIG. 5: Step S108; YES), the help unit 403 accepts pressing (operating or touching) of the "Staple/Punch" key 802a. Then, the help unit 403 switches the display window from the setting item selection window 800 directly to the setting condition input window in which the setting condition can be input for the "Staple/Punch" key 802a thus accepted. The help unit 403 displays the setting condition input window on the touch panel 201 (FIG. 5: Step S109).

As described above, the help unit 403 displays the setting item selection window displaying the plurality of setting item keys on the touch panel 201, upon detection of an operation on the HELP key 705 by the touch panel 201. In addition, the help unit 403 switches the display window on the touch panel 201 from the setting item selection window to the setting condition input window corresponding to the setting item corresponding to a particular setting item key, upon detection of an operation of the particular setting item key by the touch panel 201.

Figure 8B:
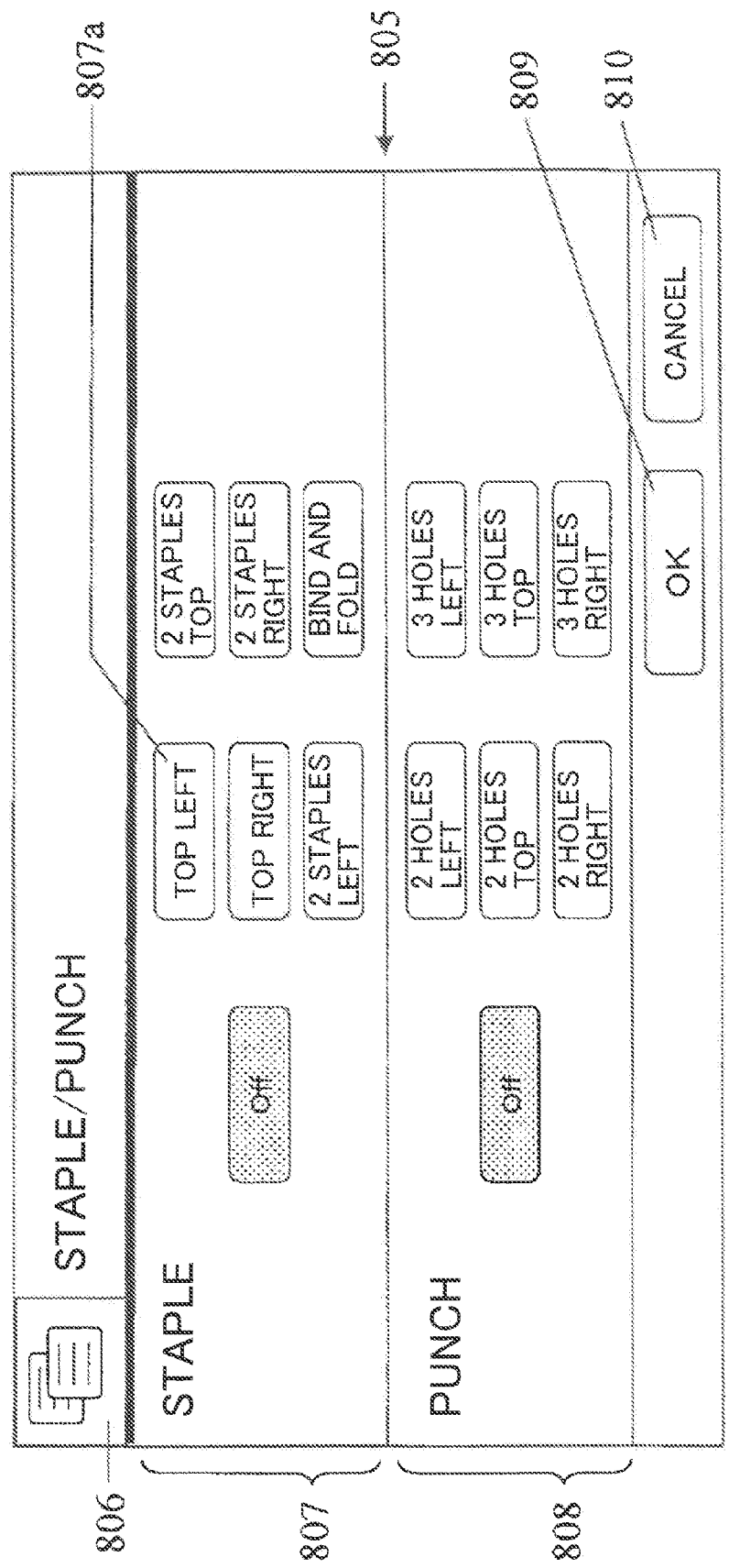
FIG. 8B is a diagram illustrating an example of the setting condition input window displayed on the touch panel according to the present embodiment.

On the setting condition input window 805 are displayed a message 806 showing a setting condition input window of the setting item "Staple/Punch" being pressed by the user, a plurality of setting condition item keys 807 corresponding to the setting conditions and an initial condition of "Staple", a plurality of setting condition item keys 808 corresponding to the setting conditions and an initial condition of "Punch", an OK key 809, and a CANCEL key 810, as shown in FIG. 8B.

By using the HELP key 705, the user can easily input the setting conditions for a setting item (for example, "Staple/Punch") in a lower layer that is not displayed on the initial window 703.

In Step S109, when the user looking at the setting condition input window 805 presses a "Top Left" key 807a, which is the setting condition item corresponding to a setting condition for "Staple", and then presses the OK key 809 (FIG. 5: Step S110; YES), the help unit 403 accepts the pressing (input) of the setting condition "Top Left" for "Staple", and notifies the shortcut inquiry unit 406 and the display acceptance unit 401. In response to the notification, the shortcut inquiry unit 406 temporarily stores the setting item "Staple/Punch" in predetermined shortcut candidate memory (FIG. 5: Step S111). In addition, in response to the notification, the display acceptance unit 401 changes, among the setting conditions already accepted, the setting condition of "Staple" for the setting item "Staple/Punch" from "OFF" (initial condition) to the setting condition "Top Left" being pressed (FIG. 5: Step S112). Then, again in Step S102, the display acceptance unit 401 displays the initial window 703 on the touch panel 201 (FIG. 5: Step S102). Input of the setting condition for the predetermined setting item "Staple/Punch" is thus completed.

In Step S102, when the user looking at the initial window 703 presses the START key 205 (FIG. 5: Step S104; YES), the display acceptance unit 401 accepts the pressing of the START key 205 and notifies a function providing unit 407 of the setting conditions being input so far. In response to the notification, the function providing unit 407 performs the copy function based on the setting conditions (FIG. 6: S201). Here, in a case in which the user has input "Top Left" as the setting condition for "Staple" as described above, the copy function is performed based on the setting condition. The user can thus obtain sheets (printed matter) stapled on an upper left corner.

When the function providing unit 407 completes performing the copy function, the display acceptance unit 401 detects the completion and notifies the shortcut inquiry unit 406. In response to the notification, the shortcut inquiry unit 406 refers to the shortcut candidate memory and determines whether the predetermined setting item is temporarily stored (FIG. 6: S202).

If it is determined that the shortcut candidate memory is not storing the predetermined setting item, the shortcut inquiry unit 406 determines that the setting condition of the copy function, which is previously performed, does not include the setting condition being input through pressing the HELP key 705 (FIG. 6: S202; NO). The shortcut inquiry unit 406 does nothing and the process is terminated.

On the other hand, if it is determined that the shortcut candidate memory stores the predetermined setting item (for example, "Staple/Punch"), the shortcut inquiry unit 406 determines that the setting condition of the copy function, which is previously performed, includes the setting condition being input through pressing the HELP key 705 (FIG. 6: S202; YES). Then, the shortcut inquiry unit 406 inquires to the user about whether a shortcut key for directly switching to the setting condition input window 805 corresponding to the setting item "Staple/Punch" stored in the shortcut candidate memory should be registered or not (FIG. 6: S203).

As described above, when the touch panel 201 detects an input operation of the setting condition in a state in which the setting condition input window, which is switched by the help unit 403, is displayed, the shortcut inquiry unit 406 inquires about whether a shortcut key for directly switching to the setting condition input window corresponding to the setting item should be registered or not. Then, when the touch panel 201 accepts an input operation for registration of a shortcut key, the shortcut inquiry unit 406 then accepts registration of a shortcut key for directly switching to the setting condition input window corresponding to the setting item.

Here, as a method by which the shortcut inquiry unit 406 inquires about whether the registration should be made or not, a method of displaying a registration prompt window for prompting registration of the shortcut key on the touch panel 201 for a predetermined amount of time (for example, 30 seconds, 1 minute, 3 minutes, 5 minutes, or the like) after completion of performing the copy function can be employed.

Here, the shortcut inquiry unit 406 can be configured such that, in a case in which a predetermined process is in progress in the predetermined processing unit based on the setting condition thus input, the registration prompt window for prompting the registration of the shortcut key is displayed on the touch panel 201.

Alternatively, the shortcut inquiry unit 406 can be configured such that, in a case in which a predetermined process is in progress in the predetermined processing unit based on the setting condition thus input, a registration prompt window for prompting the registration of the shortcut key is displayed on the touch panel 201 after completion of the process.

Furthermore, the shortcut inquiry unit 406 can be configured such that, in a case in which a predetermined process is in progress in the predetermined processing unit based on the setting condition thus input, a registration prompt window for prompting the registration of the shortcut key is displayed on the touch panel 201 for a predetermined amount of time after completion of the process.

In a registration prompt window 900, a message 901 of "Setting item window selected in the Help function can be registered as a shortcut", a setting item 902 stored in the shortcut candidate memory ("Staple/Punch"), a YES key 903, and a NO key 904 are displayed, as shown in FIG. 9A.

As a result, the multifunction peripheral 100 (operation unit 102) targets a setting item that is not displayed on the initial window 703 and cannot be easily found, i.e. a setting item for which a setting condition is input by using the HELP key 705, for shortcut registration. The multifunction peripheral 100 (the operation unit 102) thus can eliminate unnecessary shortcut registration and only target a setting item, which is likely to be efficiently used, for shortcut registration.

If the user looking at the sheets thus stapled presses the YES key 903 on the registration prompt window 900 (FIG. 6: S204; YES), the shortcut inquiry unit 406 will store the setting item targeted for shortcut registration ("Staple/Punch") to the shortcut storage unit 405 (FIG. 6: S205) and clear the setting item stored in the shortcut candidate memory ("Staple/Punch") in response to the pressure on the YES key 903. The shortcut inquiry unit 406 then terminates the process (FIG. 6: S206). As a result, the user can register a shortcut for the setting item after checking the processed sheets and evaluating the convenience of the setting item for which the user has input the setting condition. The multifunction peripheral 100 (the operation unit 102) thus can only target a setting item that is likely to be efficiently used, for shortcut registration.

On the other hand, in Step S203, when the user looking at the registration prompt window 900 presses the NO key 904 (FIG. 6: S204; NO), the shortcut inquiry unit 406 clears the setting item stored in the shortcut candidate memory ("Staple/Punch") in response to the pressing of the NO key 904. The shortcut inquiry unit 406 then terminates the process (FIG. 6: S206). This operation by the user is for a case in which the user considers the shortcut registration unnecessary after checking the processed sheets.

In a case in which the shortcut storage unit 405 stores the predetermined setting item ("Staple/Punch"), the following process takes place.

In Step S102, when the display acceptance unit 401 displays the initial window, the shortcut acceptance unit 404 refers to the shortcut storage unit 405 (FIG. 5: Step S103).

Here, since the shortcut storage unit 405 is storing the setting item "Staple/Punch", the shortcut acceptance unit 404 determines that there is a shortcut registration (FIG. 5: Step S103; YES). Then, the shortcut acceptance unit 404 displays a shortcut key corresponding to the setting item "Staple/Punch" on the initial window (FIG. 5: Step S113). The shortcut acceptance unit 404 displays the initial window including the shortcut key corresponding to the setting item "Staple/Punch" on the touch panel 201, such that the shortcut key can be detected by the touch panel 201.

Figure 9B:
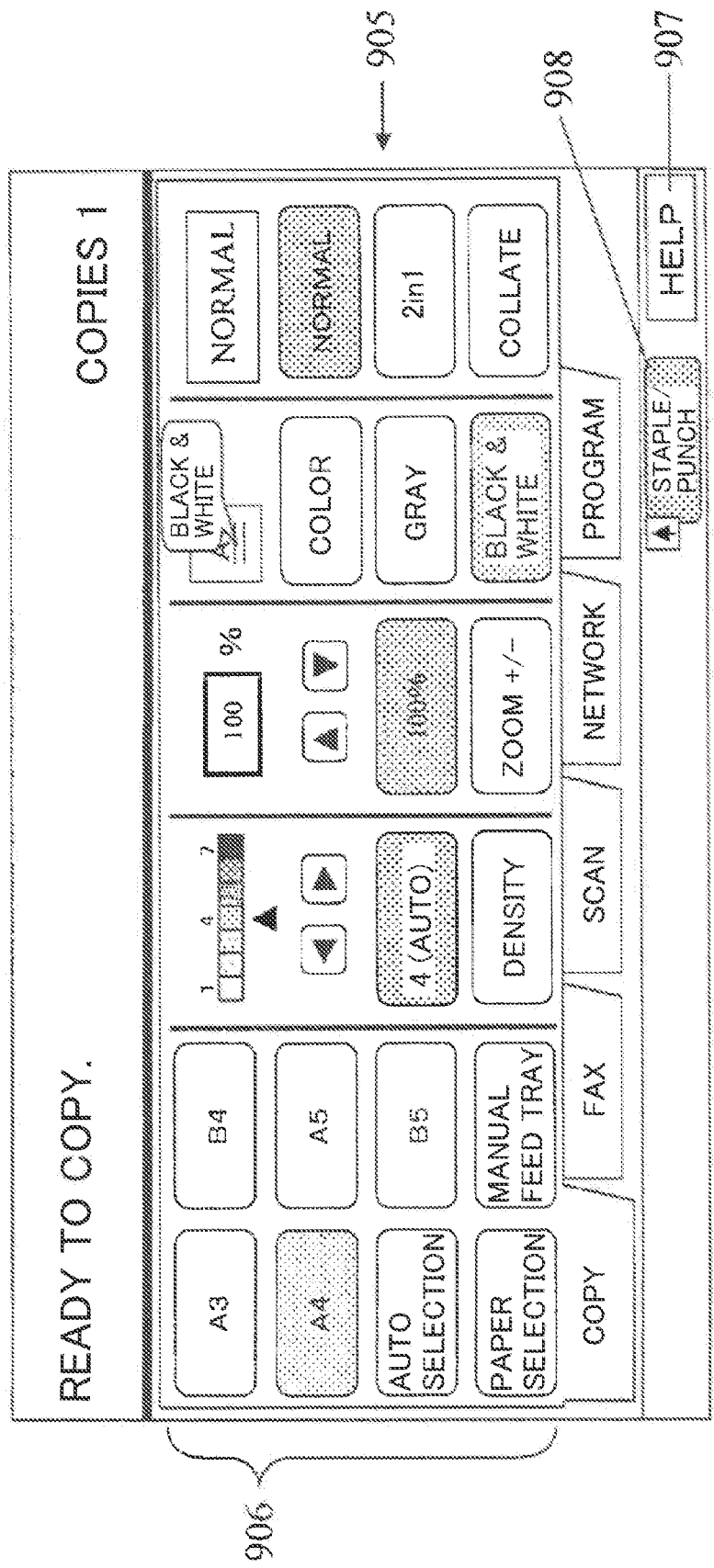
FIG. 9B is a second diagram illustrating an example of the initial window displayed on the touch panel according to the present embodiment.

As shown in FIG. 9B, on an initial window 905 after the shortcut registration, the setting item key 906 and the HELP key 907 are displayed, as well as a shortcut key 908 corresponding to the setting item "Staple/Punch" being displayed in the vicinity of the HELP key 907.

More specifically, the touch panel 201 displays the shortcut key 908 corresponding to the setting item "Staple/Punch" in the vicinity of the HELP key 907 on the initial window 905 after the shortcut registration, such that an operation to the shortcut key 908 can be detected.

As described above, if the shortcut key is registered by the shortcut inquiry unit, the shortcut acceptance unit 404 displays the shortcut key to be used for directly switching to the setting condition input window corresponding to the setting item on the initial window (operation window) on the touch panel 21, such that an operation on the shortcut key can be detected.

The shortcut acceptance unit 404 displays the shortcut key so as to be adjacent to the HELP key on the initial window (operation window).

In addition, if the shortcut key is registered by the shortcut key inquiry unit 406, the shortcut acceptance unit 404 switches the display window on the touch panel 201 to the operation window displaying the shortcut key.

In Step S103, when the user looking at the initial window 905 presses the shortcut key 908 displayed thereon (FIG. 5: Step S105; YES), the shortcut acceptance unit 404 accepts the pressing of the shortcut key 908. Then, the shortcut acceptance unit 404 switches the display window on the touch panel 201 from the initial window 905 to the setting condition input window 805 of the setting item "Staple/Punch" (see FIG. 8B) corresponding to the shortcut key 908. The shortcut acceptance unit 404 displays the setting condition input window 805 on the touch panel 201 (FIG. 6: S207).

By using the shortcut key 908, the user can easily input the setting condition for the setting item "Staple/Punch" without using the HELP key 705 (907). As a result, in the multifunction peripheral 100 (operation unit 102), the number of operations by a user required for reaching a setting condition input window for a predetermined setting item can be reduced, thereby reducing the amount of time for operation.

Here, for example, when a user looking at the setting condition input window 805 shown in FIG. 8B inputs a predetermined setting condition (FIG. 6: S208; YES), the shortcut acceptance unit 404 accepts the input of the setting condition and notifies the display acceptance unit 401. In response to the notification, the display acceptance unit 401 changes, among the setting conditions already accepted, the setting condition (initial condition) for the setting item corresponding to the shortcut key to the setting condition being input (FIG. 6: S209). Then, returning to Step S102, the display acceptance unit 401 displays the initial window 905 on the touch panel 201 (FIG. 5: Step S102).

On the other hand, in step S2, when a user looking at the setting condition input window 805 presses the CANCEL key 810 (FIG. 6: S208; NO), the shortcut acceptance unit 404 accepts the pressing of the CANCEL key 810 and notifies the display acceptance unit 401. In response to the notification, returning to Step S102, the display acceptance unit 401 displays the initial window 905 on the touch panel 201 (FIG. 5: Step S102).

The shortcut key 908 is thus used.

However, in Step S107, when a user looking at the setting condition selection window 800 presses the CANCEL key 804 (FIG. 5: Step S108; NO), the help unit 403 accepts the pressing of the CANCEL key 804 and notifies the display acceptance unit 401. In response to the notification, returning to Step S102, the display acceptance unit 401 displays the initial window 703 on the touch panel 201 (FIG. 5: Step S102).

In addition, in Step S110, when a user looking at the setting condition input window 805 presses the CANCEL key 810 (FIG. 5: Step S110; NO), the help unit 403 accepts the pressing of the CANCEL key 810 and notifies the display acceptance unit 401. In response to the notification, returning to Step S102, the display acceptance unit 401 displays the initial window 703 on the touch panel 201 (FIG. 5: Step S102).

As described above, the operation unit 102 of the present embodiment is provided with the help unit 403 that, upon pressing of the HELP key 705, displays the setting condition input window in which the setting condition for a predetermined setting item 802, among the plurality of setting items 802 configuring the setting condition, can be input, and guides input of the setting condition for the setting item 802. The operation unit 102 is also provided with: the shortcut inquiry unit 406 that inquires about whether the shortcut key 908 for directly switching to the setting condition input window corresponding to the setting item 802 should be registered or not when the setting condition for the predetermined setting item 802 is input though pressing of the HELP key 705; and the shortcut acceptance unit 404 that displays the shortcut key 908 on the initial window (operation window) so as to be detected by the touch panel when the shortcut key 908 is registered.

As a result, the multifunction peripheral 100 (operation unit 102) can target only the setting item that can only be reached by using the HELP key 705 for the shortcut registration, thereby registering only shortcuts required by the user, eliminating unnecessary shortcut registration. Once the shortcut registration is made through pressing the HELP key 705, the shortcut key 908 can be used without using the HELP key 705. Therefore, the multifunction peripheral 100 (operation unit 102) can reduce the amount of time for operation by registering a shortcut that can be efficiently used and reducing the number of operations for reaching the setting condition input window.

It should be noted that, in the operation unit 102 of the present embodiment, although the help unit 403 is configured to accept pressing of the setting item key by a user via the setting item selection window, the present invention is not limited thereto. For example, the help unit 403 can be configured to: in response to pressing of the HELP key 705, display keyboard keys and an input field to which a predetermined keyword can be input; accept input of a predetermined keyword from a user; display the setting item key relating to the keyword to be pressable (detected by the touch panel); and accept pressing of the predetermined setting item key by the user.

In addition, in the operation unit 102 of the present embodiment, although the shortcut acceptance unit 404 is configured to display the shortcut key 908 to be pressable (detected by the touch panel) for any user, the present invention is not limited thereto. For example, the shortcut inquiry unit 406 can be configured to: accept an input of a user ID in advance from a user; and register a shortcut for a predetermined setting item for each user ID, while the shortcut acceptance unit 404 can be configured to display a shortcut key corresponding to a particular user ID to be pressable (detected by the touch panel). In this case, for example, the shortcut inquiry unit 406 can display a user ID input window with keyboard keys, and accept input of the user ID from the user. In addition, the shortcut acceptance unit 404 can be configured to prompt a user to pass a user ID card storing the user ID over a card reader provided in advance and to accept input of the user ID from the card reader. Alternatively, the shortcut acceptance unit 404 can be configured to accept an input of the user ID upon displaying the initial window.

In the operation unit 102 of the present embodiment, although the shortcut acceptance unit 404 is configured to display the shortcut key 908 immediately on the initial window, the shortcut key 908 can be displayed or hidden according to a setting by the user. For example, the shortcut acceptance unit 404 can be configured to accept setting of whether to display the shortcut key from a user via a predetermined system menu window, and to display the shortcut key only in a case in which the setting to display the shortcut key is accepted. The trouble in the display of shortcut keys can be solved by the multifunction peripheral 100 (operation unit 102) adopting the abovementioned configuration.

In addition, although the operation unit 102 according to the present embodiment is adopted for processes in a copy function of the multifunction peripheral 100, it may be also adopted for a scanning function, a facsimile communication function, a printing function, and the like, for example. Furthermore, in the present embodiment, although the operation unit 102 has been described in relation to application to the multifunction peripheral 100, application with the same operation and effect is also possible in relation to various types of image forming apparatuses, various types of image processing apparatuses, and various types of image displaying apparatuses that are provided with an operation unit 102 (operation device) that has a touch panel 301.

Furthermore, in the present embodiment although the operation unit 102 was configured with various units, a configuration may include provision of a storage medium that enables storage of a program for realizing the respective units in the storage medium. In such a configuration, the operation unit 102 or the multifunction peripheral 100 reads the programs, thereby realizing the respective units by the operation unit 102 or the multifunction peripheral 100. In this case, the program itself that is read out of the storage medium may embody the operation and effect of the present invention. Alternatively, steps executed by the various units can be provided as methods stored in a hard disk.

The present embodiment may also be provided as a program to be executed by a computer, independently distributed through telecommunication lines or the like. In this case, a central processing unit (CPU) realizes a control operation in cooperation with other circuits according to the program of the present embodiment. The units realized by the program and the CPU can also be configured with specialized hardware. The program can be made available in a state of being recorded on a computer-readable recording medium, such as a CD-ROM.

The present embodiment also discloses a shortcut acceptance method for an operation apparatus including a touch panel that can display a plurality of kinds of windows including an operation window displaying a HELP key for guiding input of a setting condition of a predetermined setting item, such that an input operation, including an operation on a plurality of software keys including the HELP key, can be detected, the shortcut acceptance method displaying the shortcut key on the operation window on the touch panel, such that an operation on the shortcut key can be detected, the method including: a help step of switching, either directly or via another window, the display window on the touch panel from the operation window to a setting condition input window in which the setting condition of a predetermined setting item among a plurality of setting items can be input, upon detection of the operation on the HELP key displayed on the operation window by the touch panel; a shortcut inquiry step of, upon detection by the touch panel of an input operation of the setting condition in a state in which the setting condition input window, which has been switched in the help step, is displayed, inquiring about whether registration of a shortcut key used for directly switching to the setting condition input window corresponding to the setting item is desired or not, and accepting the registration of the shortcut key used for directly switching to the setting condition input window corresponding to the setting item if the input operation for registration of the shortcut key is accepted; and a shortcut acceptance step of, if the shortcut key is registered in the shortcut inquiry step, displaying the shortcut key used for directly switching to the setting condition input window corresponding to the setting item on the operation window on the touch panel, such that an operation on the shortcut key can be detected.

As described above, the operation apparatus and operation method according to the present embodiment are useful not only for a multifunction peripheral, but also for a copier, a printer and the like, and effective as an operation apparatus and multifunction peripheral that can register a shortcut only for a setting item that can only be reached by using the HELP key.

The invention claimed is:
1. An operation apparatus comprising:
 a touch panel that can display a plurality of kinds of window including an operation window displaying a HELP key for guiding input of a setting condition of a predetermined setting item, such that an input operation, including an operation on a plurality of software keys including the HELP key, can be detected;
 a help unit that switches, either directly or via another window, the display window that is displayed on the touch panel from the operation window to a setting condition input window in which the setting condition of a predetermined setting item among a plurality of setting items can be input, upon detection of the operation on the HELP key displayed on the operation window by the touch panel;
 a shortcut inquiry unit that inquires about whether registration of a shortcut key used for directly switching to the setting condition input window corresponding to the setting item is desired or not, upon detection by the touch panel of an input operation of the setting condition in a state in which the settin condition in s ut window havin been switched by the help unit is being displayed, and that accepts the registration of the shortcut key if the input operation for registration of the shortcut key is accepted by way of the touch panel; and
 a shortcut acceptance unit that displays the shortcut key on the operation window on the touch panel such that an operation on the shortcut key can be detected, if the shortcut key is registerd by the shortcut inquiry unit,
 wherein: the operation apparatus has a predetermined processing unit or the operation apparatus is connected to the predetermined processing unit; and
 the shortcut inquiry unit displays a registration prompt window for prompting the registration of the shortcut key on the touch panel in a case in which a predetermined process is in progress in the predetermined processing unit based on the setting condition thus input.

2. The operation apparatus according to claim 1, wherein the shortcut acceptance unit displays the shortcut key so as to be adjacent to the HELP key on the operation window.

3. The operation apparatus according to claim 1, wherein the shortcut acceptance unit switches the display window displayed on the touch panel to an operation window displaying the shortcut key if the shortcut key is registered by the shortcut key inquiry unit.

4. The operation apparatus according to claim 1, wherein the help unit: displays a setting item selection window displaying a plurality of setting item keys on the touch panel, upon detection of an operation on the HELP key by way of the touch panel; and
 switches the display window displayed on the touch panel from the setting item selection window to the setting condition input window corresponding to the setting item corresponding to a particular setting item key, upon detection of an operation of the particular setting item key by way of the touch panel.

5. The operation apparatus according to claim 4, wherein the help unit displays a setting item key that is displayed on a lower layer window than the operation window, on the setting item selection window on the touch panel, such that an operation on the setting item key can be detected.

6. An operation apparatus comprising:
 a touch panel that can display a plurality of kinds of window including an operation window displaying a HELP key for guiding input of a setting condition of a predetermined setting item, such that an input operation,including an operation on a plurality of software keys including the HELP key, can be detected;
 a help unit that switches, either directly or via another window, the display window that is displayed on the touch panel from the operation window to a setting condition input window in which the setting condition of a predetermined setting item among a plurality of setting items can be input, upon detection of the operation on the HELP key displayed on the operation window by the touch panel;

a shortcut inquiry unit that inquires about whether registration of a shortcut key used for directly switching to the setting condition input window corresponding to the setting item is desired or not u on detection b the touch panel of an input operation of the setting condition in a state in which the setting condition input window having been switched b the hell unit is being displayed, and that accepts the registration of the shortcut key if the input operation for registration of the shortcut key is accepted by way of the touch panel; and a shortcut acceptance unit that displays the shortcut key on the operation window on the touch panel such that an operation on the shortcut key can be detected, if the shortcut key is registered by the shortcut inquiry unit, wherein: the operation apparatus has a predetermined processing unit or the operation apparatus is connected to the predetermined processing unit; and the shortcut inquiry unit displays a registration prompt window for prompting the registration of the shortcut key on the touch panel after completion of a predetermined process in a case in which the predetermined process is in progress in the predetermined processing unit based on the setting condition thus input.

7. The operation apparatus according to claim 6, wherein the shortcut inquiry unit displays the registration prompt window for a predetermined amount of time.

8. An image forming apparatus comprising:

an operation apparatus including: a touch panel that can display a plurality of kinds of windows including an operation window displaying a HELP key for guiding input of a setting condition of a predetermined setting item, such that an input operation, including an operation on a plurality of software keys including the HELP key, can be detected;

a help unit that switches, either directly or via another window, a display window displayed on the touch panel from the operation window to a setting condition input window in which the setting condition of a predetermined setting item among a plurality of setting items can be input, upon detection of the operation on the HELP key displayed on the operation window by way of the touch panel;

a shortcut inquiry unit that inquires about whether registration of a shortcut key used for directly switching to the setting condition input window corresponding to the setting item is desired or not, upon detection by the touch panel of an input operation of the setting condition in a state in which the setting condition input window having been switched by the help unit is being displayed, and that accepts the registration of the shortcut key if the input operation for registration of the shortcut key is accepted; and a shortcut acceptance unit that displays the shortcut key on the operation window on the touch panel such that an operation on the shortcut key can be detected, if the shortcut key is registered by the shortcut inquiry unit, wherein: the operation apparatus has a predetermined processing unit or the operation apparatus is connected to the predetermined processing unit and the shortcut inquiry unit displays a registration prompt window for prompting the registration of the shortcut key on the touch panel in a case in which a predetermined process is in progress in the predetermined processing unit based on the setting condition thus input.

9. The image forming apparatus according to claim 8, wherein the shortcut acceptance unit displays the shortcut key so as to be adjacent to the HELP key on the operation window.

10. The image forming apparatus according to claim 8, wherein the shortcut acceptance unit switches the display window displayed on the touch panel to an operation window displaying the shortcut key, if the shortcut key is registered by the shortcut key inquiry unit.

11. The image forming apparatus according to claim 8, wherein the help unit: displays the setting item selection window displaying a plurality of setting item keys on the touch panel, upon detection of an operation on the HELP key by way of the touch panel; and switches the display window displayed on the touch panel from the setting item selection window to a setting condition input window corresponding to the setting item corresponding to a particular setting item key, upon detection of an operation of the particular setting item key by way of the touch panel.

12. The image forming apparatus according to claim 11, wherein the help unit displays a setting item key that is displayed on a lower layer window than the operation window, on the setting item selection window on the touch panel, such that an operation on the setting item key can be detected.

13. An image forming apparatus comprising:

an operation apparatus including: a touch panel that can display a plurality of kinds of windows including an operation window displaying a HELP key for guiding input of a setting condition of a predetermined setting item, such that an input operation, including an operation on a plurality of software keys including the HELP key, can be detected;

a help unit that switches, either directly or via another window, a display window displayed on the touch panel from the operation window to a setting condition input window in which the setting condition of a predetermined setting item among a plurality of setting items can be input, upon detection of the operation on the HELP key displayed on the operation window by way of the touch panel;

a shortcut inquiry unit that inquires about whether registration of a shortcut key used for directly switching to the setting condition input window corresponding to the setting item is desired or not, upon detection by the touch panel of an input operation of the setting condition in a state in which the setting condition input window having been switched by the help unit is being displayed, and that accepts the registration of the shortcut key if the input operation for registration of the shortcut key is accepted; and a shortcut accepted unit that displays the shortcut key on the operation window on the touch panel such that an operation on the shortcut key can be detected, if the shortcut key is registerd by the shortcut inquiry unit, wherein: the operation apparatus has a predetermined processing unit or the operation apparatus is connected to the predetermined processing unit; and the shortcut inquiry unit displays a registration prompt window for prompting the registration of the shortcut key on the touch panel after completion of a predetermined process in a case in which the predetermined process is in progress in the predetermined processing unit based on the setting condition thus input.

14. The image forming apparatus according to claim 13, wherein the shortcut inquiry unit displays the registration prompt window for a predetermined amount of time.

15. A shortcut acceptance method for an operation apparatus including a touch panel that can display a plurality of kinds of windows including an operation window displaying a HELP key for guiding input of a setting condition of a predetermined setting item, such that an input operation, including an operation on a plurality of software keys including the HELP key, can be detected, the shortcut acceptance method displaying a shortcut key on the operation window on the touch panel, such that an operation on the shortcut key can be detected, the method comprising:
a help step of switching, either directly or via another window, a display window displayed on the touch panel from the operation window to a setting condition input window in which the setting condition of a predetermined setting item among a plurality of setting items can be input, upon detection of the operation on the HELP key displayed on the operation window by way of the touch panel;
a shortcut inquiry step of inquiring, via the operation apparatus, about whether registration of a shortcut key used for directly switching to a setting condition input window corresponding to the setting item is desired or not, upon detection by the touch panel of an input operation of the setting condition in a state in which the setting condition input window having been switched in the help step is being displayed, and accepting, via the operation apparatus, the registration of the shortcut key if the input operation for registration of the shortcut key is accepted; and
a shortcut acceptance step of displaying, via the operation apparatus, the shortcut key on the operation window on the touch panel such that an operation on the shortcut key can be detected, if the shortcut key is registered in the shortcut inquiry step,
wherein: the operation apparatus has a predetermined processing unit or the operation apparatus is connected to the predetermined processing unit; and
the shortcut inquiry step displays a registration prompt window for prompting the registration of the shortcut key on the touch panel in a case in which a predetermined process is in progress in the predetermined processing unit based on the setting condition thus input.

16. A non-transitory computer-readable medium storing a computer program including instructions to implement the shortcut acceptance method according to claim 15.

* * * * *